US012803745B2

(12) United States Patent
Tang et al.

(10) Patent No.: US 12,803,745 B2
(45) Date of Patent: Nov. 17, 2026

(54) REFERENCE SIGNAL DESIGN AND PROCESSING FOR WIRELESS SENSING IN INTEGRATED SENSING AND COMMUNICATIONS SYSTEM

(71) Applicants: MediaTek Singapore Pte. Ltd., Singapore (SG); Shanghai Jiao Tong University, Shanghai (CN)

(72) Inventors: Aimin Tang, Shanghai (CN); Qimin Zhao, Shanghai (CN); Wenze Qu, Beijing (CN); Hao Bi, San Jose, CA (US); Rui Zhang, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 332 days.

(21) Appl. No.: 18/595,401

(22) Filed: Mar. 4, 2024

(65) Prior Publication Data

US 2024/0305426 A1 Sep. 12, 2024

Related U.S. Application Data

(63) Continuation of application No. PCT/CN2023/080105, filed on Mar. 7, 2023.

(30) Foreign Application Priority Data

Mar. 1, 2024 (CN) ......................... 202410238542.6

(51) Int. Cl.
*H04L 5/00* (2006.01)

(52) U.S. Cl.
CPC .......... *H04L 5/0051* (2013.01); *H04L 5/0007* (2013.01); *H04L 5/0094* (2013.01)

(58) Field of Classification Search
CPC .... H04L 5/0094; H04L 5/0051; H04L 5/0007
See application file for complete search history.

(56) References Cited

U.S. PATENT DOCUMENTS

2021/0359811 A1* 11/2021 Zewail .................. H04L 5/0051
2022/0006561 A1* 1/2022 Golitschek Edler Von Elbwart ............... H04B 7/0456

* cited by examiner

*Primary Examiner* — Kent Krueger
(74) *Attorney, Agent, or Firm* — Helen Mao; Imperium Patent Works

(57) ABSTRACT

In one novel aspect, OFDM RS symbols are configured with zero-power RS occupying either all even subcarrier or all odd subcarriers and the non-zero-power RS occupy all or part of remaining subcarriers. In one embodiment, even component RS symbols and odd component RS symbols are alternatively inserted in data frames with frequency offsets. In one embodiment, the receiver performs a wireless sensing by sampling a final-half duration with phase preprocessing. In one novel aspect, the target distance and velocity are uniquely determined via estimating clustering-range rate during successive CPIs. In one embodiment, the UE performing successive sensing for multiple clusters based on the diamond-shaped RS configuration during N successive CPIs, and a range rate for each cluster, selects a cluster with velocity that matches the calculated range rate, and determines a target distance and velocity based on the selected cluster.

15 Claims, 7 Drawing Sheets

REFERENCE SIGNAL DESIGN AND PROCESSING FOR WIRELESS SENSING IN INTEGRATED SENSING AND COMMUNICATIONS SYSTEM

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2023/080105, titled "REFERENCE SIGNAL DESIGN AND PROCESSING FOR WIRELESS SENSING IN INTEGRATED SENSING AND COMMUNICATIONS SYSTEM," with an international filing date of Mar. 7, 2023. This application claims priority under 35 U.S.C. § 119 from Chinese Application Number 202410238542.6, titled "REFERENCE SIGNAL DESIGN AND PROCESSING FOR WIRELESS SENSING IN INTEGRATED SENSING AND COMMUNICATIONS SYSTEM," filed on Mar. 1, 2024. The disclosure of each of the foregoing documents is incorporated herein by reference.

TECHNICAL FIELD

The disclosed embodiments relate generally to integrated sensing and communications (ISAC), and particularly relates to reference signal design and processing schemes for long-range radar sensing in an ISAC system.

BACKGROUND

Mobile communication standard is have been developed into a new era of beyond 5G (B5G) and 6G. These next-generation wireless networks promise unprecedented speeds, ultra-low latency, and support for a multitude of devices, ushering in an era of connectivity that will revolutionize industries and daily life. In one area, the B5G/6G system is envisioned to achieve radar sensing while transmitting communication orthogonal frequency-division multiplexing (OFDM) waveform. When the sensing target is very far away from the radar receiver, the delay of target echoed signal may exceed cyclic prefix (CP), which results in inter-symbol-interference or inter-carrier-interference (ISI/ICI). To ensure the sensing performance with required signal-to-interference-plus-noise ratio (SINR), it costs high power consumption. Otherwise, the CP period is increased, and the transmission efficiency is reduced. Therefore, a specific reference signal (RS) design and corresponding signal processing scheme are desired to resolve long-range radar (LRR) sensing.

Improvements and enhancements are required for reference signal design and processing for wireless sensing in the ISAC system.

SUMMARY

Apparatus and methods are provided for RS design and processing for wireless sending in ISAC. In one novel aspect, zero-power RS OFDM symbols are configured with zero-power RS occupying either all even subcarriers or all odd subcarriers and the non-zero-power RS occupying all or part of remaining subcarriers. In one embodiment, even component zero-power RS symbols and odd component zero-power RS symbols are alternatively inserted in data frames. In one embodiment, the odd component zero-power RS symbols and even component zero-power RS symbols are alternatively inserted with frequency offsets. In one embodiment, multiple non-zero power RS in each zero-power RS symbol are equally spaced. In one embodiment, the receiver, a UE or a base station, performs a wireless sensing by sampling a final-half duration of one or more zero-power RS symbols. In one embodiment, a phase pre-processing is performed for each odd component zero-power RS symbol before the sampling of the final-half duration of corresponding zero-power RS symbol. In one embodiment, the sender and/or the receiver, receives sensing and communication requirements from the wireless network, wherein the sensing and communication requirements comprising at least one element comprising a sensing mode, a sensing scenario, a maximum detection distance and velocity of interest, and service requirements corresponding to the RS configuration.

In one novel aspect, the target distance and velocity are uniquely determined via calculating clustering-range rate during successive coherent processing intervals (CPIs). In one embodiment, the UE calculates multiple clusters of a set of target distance and velocity performing successive sensing based on the RS configuration during N successive radar coherent processing intervals (CPI), and a range rate for each cluster, selects a cluster with velocity that matches the calculated range rate, and determines a target distance and velocity based on the selected cluster.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Several aspects of telecommunication systems will now be presented with reference to various apparatus and methods. These apparatus and methods will be described in the following detailed description and illustrated in the accompanying drawings by various blocks, components, circuits, processes, algorithms, etc. (Collectively referred to as "elements"). These elements may be implemented using electronic hardware, computer software, or any combination thereof. Whether such elements are implemented as hardware or software depends upon the particular application and design constraints imposed on the overall system. Also please note that although some embodiments are described in 5G context, the invention can be applied to 6G or other radio access technology.

Figure 1:
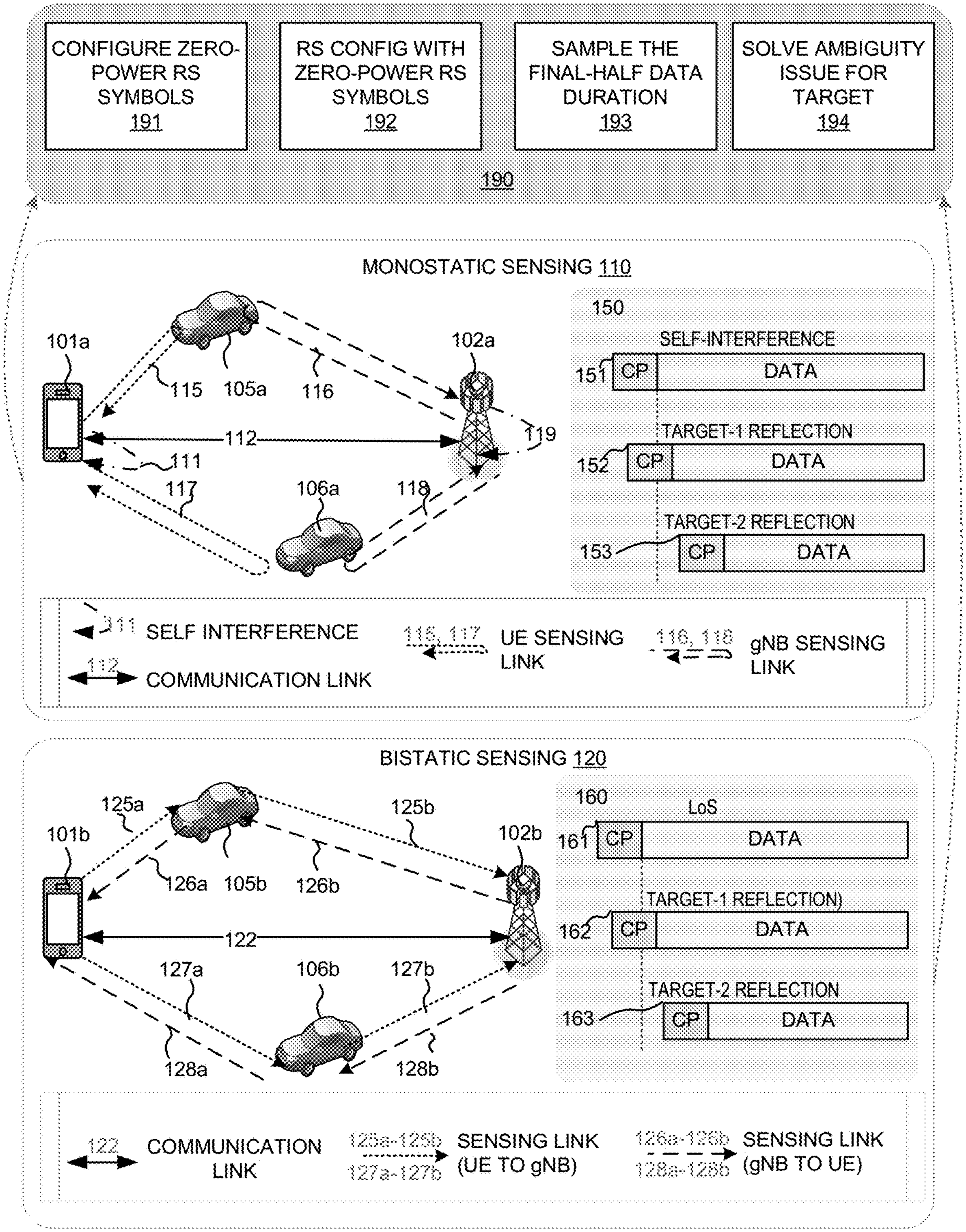
FIG. 1 illustrates schematic system diagrams illustrating two scenarios of integrated sensing and communication system in accordance with embodiments of the current invention.

FIG. 1 illustrates schematic system diagrams illustrating two scenarios of integrated sensing and communication system in accordance with embodiments of the current invention. The exemplary wireless network includes one or more UEs, such as UE 101*a* and UE 101*b*, and one or more base stations (BS), such as BS 102*a* and BS 102*b*. The wireless network can be a cellular network and employ the New Radio (NR) technologies and B5G/6G technologies developed by the 3rd Generation Partnership Project (3GPP) for wireless communications between the UE, such as UE 101*a* and UE 101*b*, and one or more base stations, such as BS 102*a* and BS 102*b*. The UE, such as UE 101*a* and UE 101*b*, can be a mobile phone, a laptop computer, a device carried in a vehicle, and the like. The base station, such as BS 102*a* and BS 102*b*, can be an implementation of a gNB specified in NR standards. Accordingly, the UE, such as UE 101*a* and 101*b*, can communicate with the base station, such as BS 102*a* and BS 102*b*, through a wireless communication channel according to communication protocols specified in respective communication standards. The invention is not limited by this. The base station, such as BS 102*a* and BS 102*b*, may also be referred to as an access point, an access terminal, a base station, a Node-B, an eNode-B (eNB), a gNB, or by other terminology used in the art. The network can be a homogeneous network or heterogeneous network, which can be deployed with the same frequency or different frequencies.

In one example, the UE, such as UE 101*a* and UE 101*b*, and the base station, such as BS 102*a* and BS 102*b*, are configured to employ resource allocation design to communicate with each other. To detect the targets distributed in the environment, the active sensing mode is adopted. The UE and the base station can both function as the transmitter and the radar receiver. The transmitter transmits the communication signal with the designed RS configurations. The radar receiver receives the reflection signal from the targets and adopts the corresponding estimation algorithms to obtain target parameters, such as distance and velocity.

Two sensing scenarios including monostatic sensing 110 and bistatic sensing 120 can both be applied according to an embodiment of the disclosure. For monostatic sensing 110, UE 101*a* or BS 102*a* processes the echoes of their transmit signal. For bistatic sensing 120, either UE 101*b* serves as the transmitter and the BS 102*b* serves as the radar receiver, and vice versa. For monostatic sensing 110, UE 101*a* and BS 102*a* may establishes communication link 112. UE 101*a* processes echo sensing link signal 115 from target-1 105*a*. UE 101*a* processes echo sensing link signal 117 from target-2 106*a*. Similarly, for monostatic sensing 110, BS 102*a* processes echo sensing link signal 116 from target-1 105*a*. BS 102*a* processes echo sensing link signal 118 from target-2 106*a*. In an illustrated scenario 150, UE 101*a* has a self-interference link 111 with receiving data 151. The reflected signal 152 from target-1 105*a* has a delay and the reflected signal 153 from target-2 106*a* has a further delay received at UE 101*a*. When the sensing target is very far away from the receiver, such as UE 101*a* and/or BS 102*a*, the delay of the target echo signal will exceed the length of CP resulting in ISI/ICI, which reduces the radar SINR. Further, BS 102*a* has a self-interference link 119.

The situation is similar for bistatic sensing 120. In one configuration, UE 101*b* serves as the transmitter and transmits RS signals for sensing through 125*a*, reflected by target-1 105*b* through 125*b* to BS 102*b*. UE 101*b* serves as the transmitter and transmits RS signals for sensing through 127*a*, reflected by target-2 106*b* through 127*b* to BS 102*b*. In a different scenario, BS 102*b* serves as the transmitter and UE 101*b* serves as the receiver. BS 102*b* transmits RS signals for sensing through 126*b*, reflected by target-1 105*b* through 126*a* to UE 101*b*. BS 102*b* transmits RS signals for sensing through 128*b*, reflected by target-2 106*b* through 128*a* to UE 101*b*. In an illustrated scenario 160, UE 101*b* has a line of sight (LoS) path 161 with receiving data 161. The reflected signal 162 from target-1 105*a* has a delay and the reflected signal 163 from target-2 106*a* has a further delay received at UE 101*b*. When the sensing target is very far away from the receiver, such as UE 101*b* and/or BS 102*b*, the delay of the target echo signal will exceed the length of CP resulting in ISI/ICI, which reduces the radar SINR.

In one novel aspect, to reduce the ISI/ICI in the ISAC system, in the OFDM symbol with RS, the zero-power RS occupies all of the even or odd subcarriers, and the non-zero-power RS occupies all or part of the remaining subcarriers.

In one embodiment 191, zero-power RS symbols are configured for integrated sensing and communication. Accordingly, an apparatus, which serves as a transmitter is configured with specific RS according to the sensing and communication requirements. The apparatus can be the UE, such as UE 101*a* and UE 101*b*, or the base station, such as BS 102*a* and 102*b*. For example, the maximum detection distance and velocity of interest can indicate the frequency spacing and time spacing between adjacent RSs, respectively. Particularly, for the OFDM symbol with RS, the transmit resources only occupy the odd or even subcarriers and the remaining subcarriers are left with zero power.

In one embodiment 192, the RS configuration for RS signals is configured by inserting the zero-power RS symbols. For example, sensing RS of one direction/beam occupies subsets of subcarriers, e.g., subsets of odd or even subcarriers. The size (sampling rate in frequency and time) of odd or even subcarriers for sensing RS depends on maximum detection distance and velocity of interest, while sub-carrier spacing may be fixed; part of the remaining subcarriers of OFDM symbol with the sensing RS can transmit signal (of other RS or data); and the left subcarriers have zero power. Based on the RS configurations, the generated RS is inserted into the data in the frequency domain. Then the data along with the RS are converted into the time domain via inverse-fast-Fourier-transform (IFFT) and transmitted via radio frequency. In one embodiment, data and RS are not processed together. It should be noted that data and RS can be transmitted on the same or different analog beam.

At the receiver side, in one embodiment 193, final-half data duration is sampled, and phase preprocessing is performed for sensing. The radar receiver installed at the apparatus processes the received signal for target parameter estimation. The apparatus can be either the UE, such as UE

101*a* and/or UE 101*b*, or the base station, such as BS 102*a* and/or BS 102*b*. Also, the receiver should be informed of the sensing and communication requirements of the application and the RS configurations. In one example, samplings of the final-half duration of the OFDM symbol with RS are obtained and the phase preprocessing is conducted for the OFDM symbol with non-zero-power RS on the odd subcarriers. For the received time-domain reflection signal, the final-half duration is obtained for each OFDM symbol with RS according to the obtained RS configurations. Also, if the non-zero-power RSs occupy the odd subcarriers, a predetermined phase is compensated for each sample in the final-half duration. Otherwise, there is no phase preprocessing for the OFDM symbol with non-zero-power RS on the even subcarriers. The final-half time-domain samplings are transferred to frequency domain (maybe after preprocessing) to obtain frequency-domain symbols via fast-Fourier-transform. Accordingly, with the obtained frequency-domain symbols, some typical estimation algorithms can be applied, such as the periodogram-based estimation algorithm, multiple signal classification (MUSIC), compressed sensing (CS), etc.

In another embodiment 194, cluster-range rate is used to solve the ambiguity problem. The target distance and velocity are uniquely determined via calculating clustering-range rate during successive coherent processing intervals (CPIs). For N successive radar CPIs, ambiguous peaks with distance and velocity estimation are figured out in the range-Doppler (RD) map, respectively. Since the ambiguous peaks compose a cluster as time goes by, the range rate Dm can be calculated via least square method (LSM). Then the target is determined by the cluster with matched range rate and average velocity.

Figure 2:
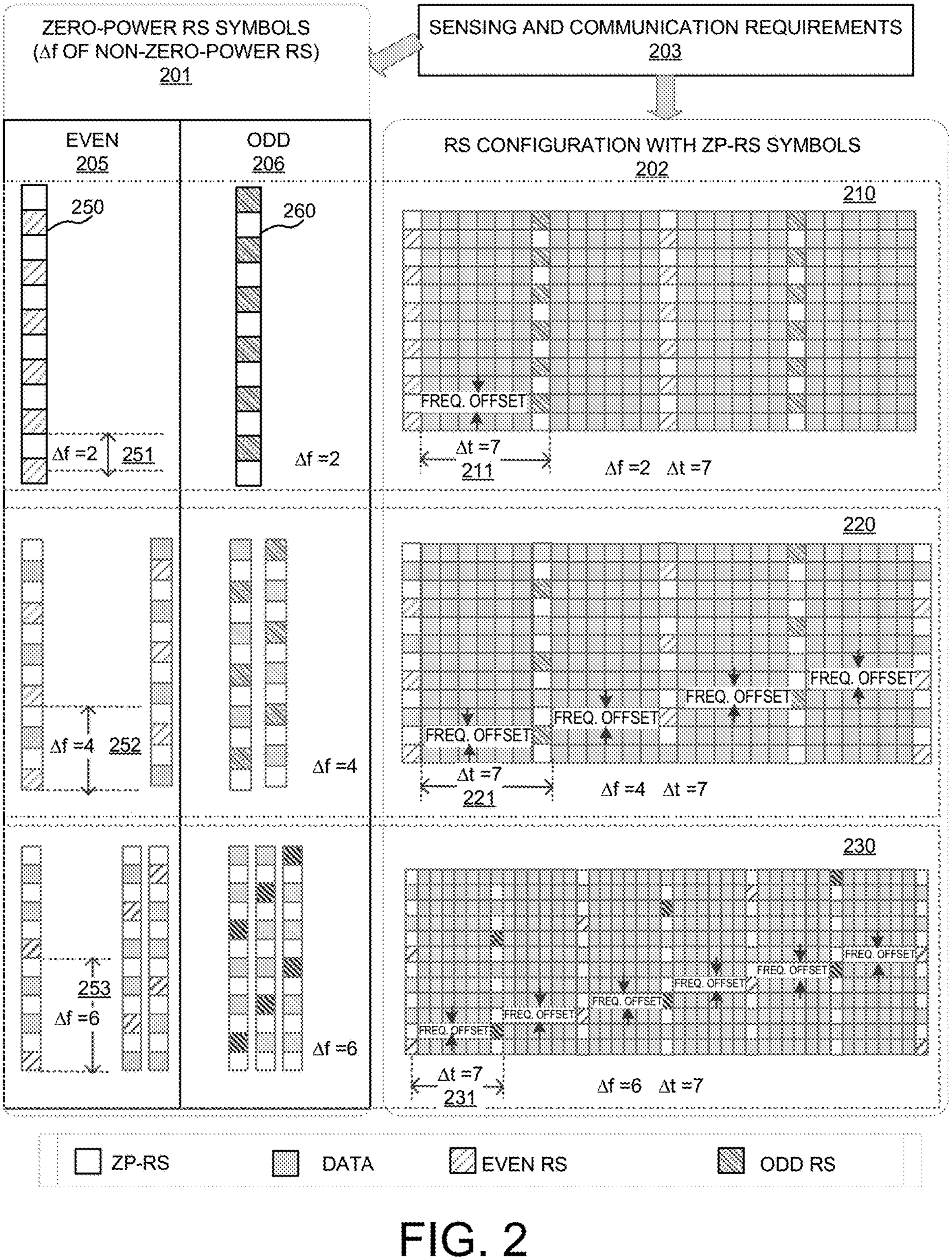
FIG. 2 illustrates exemplary diagrams for zero-power RS symbol configuration and RS configuration with zero-power RS symbols for integrated sensing and communication system in accordance with embodiments of the current invention.

FIG. 2 illustrates exemplary diagrams for zero-power RS symbol configuration and RS configuration with zero-power RS symbols for integrated sensing and communication system in accordance with embodiments of the current invention. Examples of transmit resource allocation schemes 202 with multiple RS configurations, such as 210, 220, and 230 are illustrated for RS configuration with zero-power RS symbols. In various examples, the set of system parameters can differ complying with the communication standards. For example, a CP length can be normal CP length or an extended CP length. According to some examples, multiple non-zero power RS in each zero-power RS symbol are equally spaced In one embodiment, the transmitter and/or the receiver obtains sensing and communication requirements. The sensing and communication requirements 203 comprise at least one of the sensing mode, the sensing scenario, the maximum detection distance and velocity of interest, and service requirements corresponding to the RS configuration. Specifically, the sensing mode can be divided into active sensing and passive sensing. The sensing scenario of monostatic sensing is determined if the transmitter and the radar receiver are collocated, and otherwise it is bistatic sensing. The maximum detection distance of interest indicates the maximum target distance in the detection area of interest. Different service requirements are associated with different RS configurations at the transmitter and the corresponding signal processing and parameter estimation schemes at the receiver. For example, if the delay of the echo reflected from the target with maximum detection distance exceeds the CP length so that the ISI deteriorates the detection performance, the embodiment of the disclosure can be applied in a long-range radar sensing scenario, whether it is monostatic sensing or bistatic sensing. However, the delay relevant with the target distance differs between monostatic sensing and bistatic sensing due to the geographical location of the transmitter and the receiver. The sensing and communication requirements 203 may comprise at least one of the sensing scenarios, the maximum detection distance and velocity of interest, and other communication system requirements. Specifically, the sensing scenario of monostatic sensing or bistatic sensing determines the relationship between delay and target distance. The maximum detection distance and velocity of interest assist target estimation without ambiguity. RS configurations indicating the subcarrier indices and OFDM symbol indices of RS are utilized for received RS extraction in the frequency domain and time domain.

In one embodiment, zero-power RS symbol 201 includes an even component zero-power RS symbol 205 and an odd component zero-power RS symbol 206. Based on the subcarrier indices, the OFDM symbol can be divided into even and odd components, like the OFDM symbol 250 and 260 respectively, where the OFDM symbol with non-zero-power RS on the even subcarriers (the non-zero-power RS in this case can also be called even RS) is called even component and the OFDM symbol with non-zero-power RS on the odd subcarriers (the non-zero-power RS in this case can also be called odd RS) is called odd component. In the even component OFDM symbol, the zero-power RS (ZP-RS) occupies all the odd subcarriers. In the odd component OFDM symbol, the zero-power RS occupies all the even subcarriers. Note that both the data and RS can be allocated to even or odd components such as shown by the RS configurations 205 and 206.

Then two input data sequences occupying the even and odd subcarrier indices via zero interleaving can be respectively generated by $X_e=[X[0], 0, X[1], 0, \ldots, X[N_c/2-1], 0]$ and $X_o=[0, X[0], 0, X[1], \ldots, 0, X[N_c/2-1]]$. Moreover, the even and odd component are alternatively inserted for the OFDM symbol with RS, so the transmit frequency symbols via RS insertion can be denoted by $$X'[n', \mu'] = \begin{cases} X_e[n'], & \text{when } \mu' = 2\mu\delta_t, \\ X_o[n'], & \text{when } \mu' = (2\mu+1)\delta_t, \\ \text{data}, & o.w. \end{cases}$$

Where $$n' = 0, 1, \ldots, N_c-1,\ \mu' = 0, 1, \ldots, N_s-1,\ n = 0, 1, \ldots, \left(\left\lfloor \frac{N_c}{\delta_f} \right\rfloor - 1\right),\ \mu' = 2\mu\delta_t\left(\mu = 0, 1, \ldots, \left\lfloor \frac{N_s}{2\delta_t} \right\rfloor - 1\right).$$

Accordingly, the transmitted OFDM signal is generated by the $N_c$-point IFFT:

$$x(t) = \frac{1}{N_c} \sum_{\mu=0}^{N_s-1} \sum_{n=0}^{N_c-1} X'[n', \mu'] e^{j2\pi n\delta_f t} g(t - T_o)$$

where $T_o$ is the OFDM symbol duration consisting of CP duration $T_o$ and data duration $T_d$, i.e., $T_o=T_c+T_d$.

Different service requirements correspond to different RS configurations, such as illustrated in 210, 220, and 230. Since the maximum unambiguous distance should not be less than the maximum detected distance of interest, the longer the detected distance, the denser the inserted RS along the subcarrier axis. In the first example 210, the RS subcarrier spacing 221 is two subcarriers, which can achieve the longest detection distance. The RS OFDM symbol interval 211 is seven OFDM symbols. Besides, the even component 260 and the odd component 250 are alternatively inserted with the frequency offset of a subcarrier spacing in the OFDM symbols with RS. In the second example 220, the RS subcarrier spacing 252 is four subcarriers, and the RS OFDM symbol interval 221 is seven OFDM symbols. Apart from the RS, there is a resource element (RE) allocated to data between the adjacent RSs, which also occupies the even or odd component. The remaining resources are left empty. The even and odd component are alternatively inserted with the RS frequency offset of a subcarrier spacing. In the third example 230, the RS subcarrier spacing 253 is six subcarriers, and the RS OFDM symbol interval 231 is seven OFDM symbols. Apart from the RS, there are two resource elements (REs) allocated to data between the adjacent RSs. The remaining resources are left empty. The even and odd component are alternatively inserted with the RS frequency offset of a subcarrier spacing. In other embodiments, the RS OFDM symbol interval of the above three examples can be other integer value of OFDM symbols. And the space interval of RS RE in the RS OFDM symbol of the above three examples can be other integer value of REs.

Figure 3:
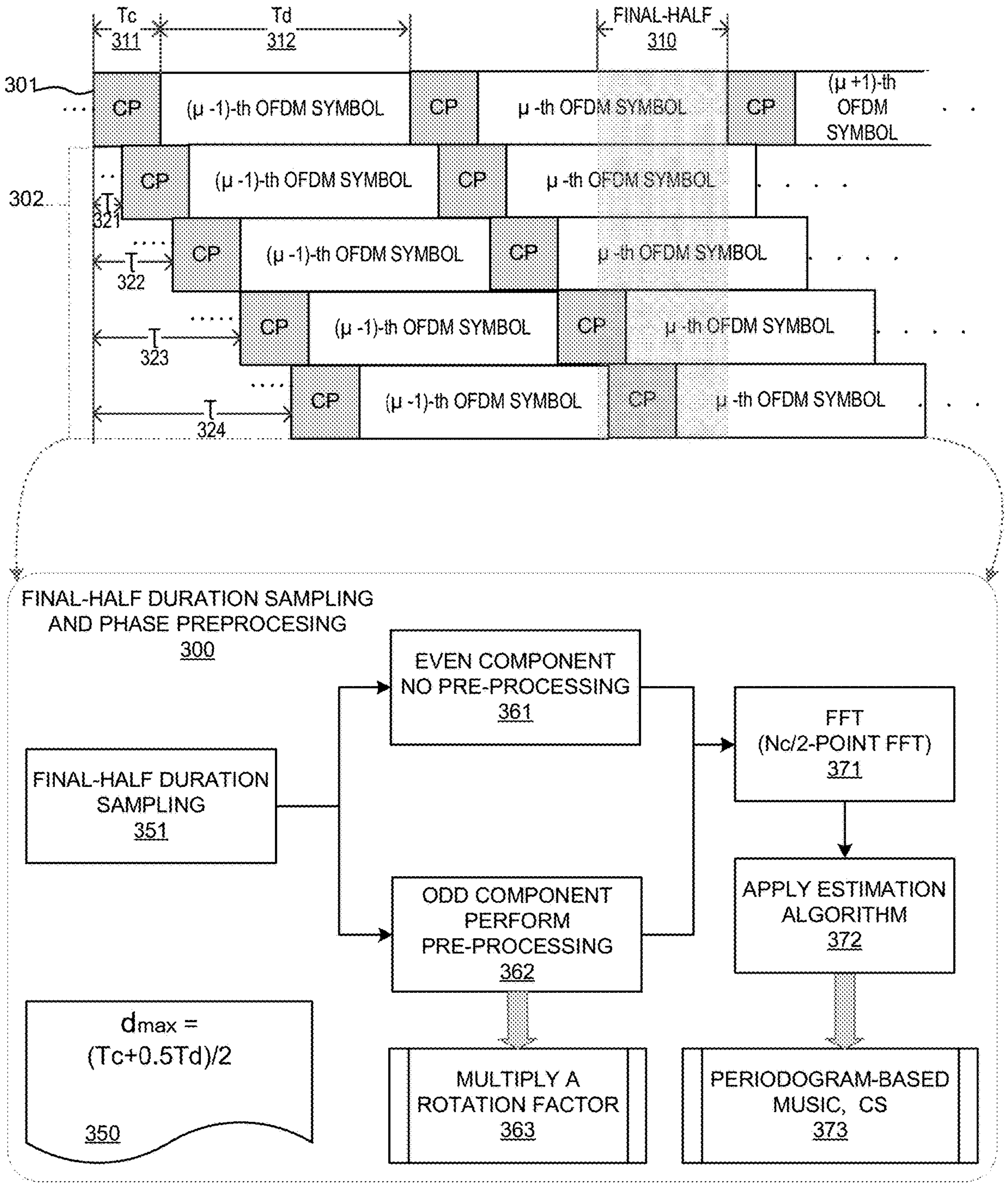
FIG. 3 illustrates exemplary diagrams for collecting samplings of the final-half duration of the receipted signal in accordance with embodiments of the current invention.

FIG. 3 illustrates exemplary diagrams for collecting samplings of the final-half duration of the receipted signal in accordance with embodiments of the current invention. The receiver is synchronized with the self-interference for mono-static sensing. If bistatic sensing is considered, the receiver may be synchronized with the line-of-sight (LoS) path signal. The synchronized signal 301 is configured with Tc 311 and Td 312. Reflected signals 302 has delay of T 321, 322, 323, and 324. With the sampling time as $$T_s = \frac{T_d}{N_c} = \frac{1}{N_c \Delta_f},$$

the discrete-time representation of the radar received signal for the OFDM symbol with RS can be expressed by $$y[k] = h_{SI}[k] \times (kT_s) + \sum_{i=1}^{I} b_i x(kT_s - \tau_i) e^{j2\pi f_{d,i} kT_s} + n[k],$$

where $b_i$, $\tau_i$, $f_{d,i}$ denote the complex attenuation, delay and Doppler spread of the i-th target among total I targets respectively, $h_{SI}$ is the channel parameter of self-interference, and n[k] is the Gaussian noise.

In one embodiment 300, final-half duration of OFDM symbol, as illustrated of 310, are used for sensing and phase preprocessing is performed.

At step 351, final-half duration sampling is performed. Removing the samples corresponding to the CP and the first half of the data duration, the remaining $N_c/2$ time samples are used for signal processing.

$$y'[k] = y[k + N_c/2]$$

$$= h_{SI}[k + N_c/2] \times (kT_s + N_c T_s/2) + \sum_{i=1}^{I} b_i \times (kT_s + N_c T_s/2 - \tau_i) e^{j2\pi f_{d,i}(kT_s + N_c T_s/2)} + n[k + N_c/2],$$

where k=0, 1, . . . , $N_c/2-1$.

The time samples of the final-half duration in the OFDM symbol with RS is converted into the frequency symbols. At step 361, for the even component, the frequency symbols can be obtained via directly applying $N_c/2$-point FFT as $$Y_e[n] =$$

$$\sum_{k=0}^{N_c/2-1} y'[k] e^{-\frac{j2\pi nk}{N_c/2}} = \frac{H_{SI}[n]}{N_c} \sum_{k=0}^{N_c/2-1} \left[ \sum_{m=0}^{N_c-1} X_e[m] e^{\frac{j2\pi m(k+N_c/2)T_s}{N_c T_s}} \right] e^{-\frac{j2\pi nk}{N_c/2}} +$$

$$\frac{b_i}{N_c} \sum_{k=0}^{N_c/2-1} \left[ \sum_{m=0}^{N_c-1} X_e[m] e^{\frac{j2\pi m(kT_s+N_c T_s/2-\tau_i)}{N_c T_s}} \right] e^{j2\pi f_{d,i}(kT_s+N_c T_s/2)} e^{-\frac{j2\pi nk}{N_c/2}} + Z[n] =$$

$$\frac{H_{SI}[n]}{N_c} \sum_{k=0}^{N_c/2-1} \left[ \sum_{m=0}^{N_c/2-1} X[m] e^{\frac{j2\pi(2m)(k+N_c/2)T_s}{N_c T_s}} \right] e^{-\frac{j2\pi nk}{N_c/2}} +$$

$$\frac{b_i}{N_c} \sum_{k=0}^{N_c/2-1} \left[ \sum_{m=0}^{N_c/2-1} X[m] e^{\frac{j2\pi(2m)(kT_s+N_c T_s/2-\tau_i)}{N_c T_s}} \right] e^{j2\pi f_{d,i}(kT_s+N_c T_s/2)} e^{-\frac{j2\pi nk}{N_c/2}} +$$

$$Z[n] = \frac{1}{2} H_{SI}[n] X[n] + \frac{1}{2} b_i X[n] e^{-\frac{j4\pi\tau_i n}{N_c T_s}} e^{j2\pi f_{d,i} T_o} + Z[n]$$

Hence, there is no ISI and ICI in the received final-half samples for radar sensing. Then zero-padding is used to get $$Y_e' = \left[ Y_e[0], 0, Y_d[0], 0, Y_d[1], 0, \ldots, Y_e\left[ \left\lfloor \frac{N_c}{\delta_f} \right\rfloor - 1 \right], 0 \right].$$

At step 362, for the odd component, the time sample k in the final-half duration is multiplied with the rotation factor $$-e^{-\frac{j2\pi k}{N_c}} \left( k = 0, \ldots N_c/2 - 1 \right)$$

(363).

At step 371, FFT is performed. In one embodiment, $N_c/2$-point FFT is used. The frequency symbols are obtained by conducting the $N_c/2$-point FFT processing as follows.

$$Y_o[n] = -\sum_{k=0}^{N_c/2-1} y'[k] e^{-\frac{j2\pi k}{N_c}} e^{-\frac{j2\pi nk}{N_c/2}} =$$

$$\frac{H_{SI}[n]}{N_c} \sum_{k=0}^{N_c/2-1} \left[ \sum_{m=0}^{N_c-1} X_o[m] e^{\frac{j2\pi m(k+N_c)T_s/2}{N_c T_s}} \right] e^{-\frac{j2\pi k}{N_c}} e^{-\frac{j2\pi nk}{N_c/2}} -$$

$$\frac{b_i}{N_c} \sum_{k=0}^{N_c/2-1} \left[ \sum_{m=0}^{N_c-1} X_o[m] e^{\frac{j2\pi m(kT_s+N_c T_s/2-\tau_i)}{N_c T_s}} \right] e^{j2\pi f_{d,i}(kT_s+N_c T_s/2)} e^{-\frac{j2\pi k}{N_c}} e^{-\frac{j2\pi nk}{N_c/2}} +$$

-continued $$Z[n] = -\frac{H_{SI}[n]}{N_c}\sum_{k=0}^{N_c/2-1}\left[\sum_{m=0}^{N_c/2-1} X[m]e^{\frac{j2\pi(2m+1)(k+N_c/2)T_s}{N_cT_s}}\right]e^{-\frac{j2\pi k}{N_c}}e^{-\frac{j2\pi nk}{N_c/2}} -$$

$$\frac{b_i}{N_c}\sum_{k=0}^{N_c/2-1}\left[\sum_{m=0}^{N_c/2-1} X[m]e^{\frac{j2\pi(2m+1)(k+N_cT_s/2-\tau_i)}{N_cT_s}}\right]$$

$$e^{j2\pi f_{d,i}(kT_s+N_cT_s/2)}e^{-\frac{j2\pi k}{N_c}}e^{-\frac{j2\pi nk}{N_c/2}} +$$

$$Z[n] = -\frac{H_{SI}[n]}{N_c}\sum_{k=0}^{N_c/2-1}\left[\sum_{m=0}^{N_c/2-1} -X[m]e^{\frac{j2\pi(2m)kT_s}{N_cT_s}}\right]e^{-\frac{j2\pi nk}{N_c/2}} -$$

$$\frac{b_i}{N_c}\sum_{k=0}^{N_c/2-1}\left[\sum_{m=0}^{N_c/2-1} -X[m]e^{\frac{j2\pi(2m)(kT_s)}{N_cT_s}}e^{\frac{-j2\pi(2m+1)\tau_i}{N_cT_s}}\right]e^{j2\pi f_{d,i}(kT_s+N_cT_s/2)}e^{-\frac{j2\pi nk}{N_c/2}} +$$

$$Z[n] = \frac{1}{2}H_{SI}[n]X[n] + \frac{1}{2}b_iX[n]e^{-\frac{j2\pi(2n+1)\tau_i}{N_cT_s}}e^{j2\pi f_{d,i}T_o} + Z[n].$$

Then zero-padding is employed to get $$Y'_o = \left[0,\ Y_o[0],\ 0,\ Y_d[0],\ 0,\ Y_d[1]\ \ldots\ ,\ 0,\ Y_o\left[\left\lfloor\frac{N_c}{\delta_f}\right\rfloor - 1\right]\right].$$

In one embodiment, alternative even and odd component RS symbols are inserted. Through the alternative RS insertion, the received frequency symbols can be represented by $$Y'[n', \mu'] = \begin{cases} Y'_e[n'], & \text{when } \mu' = 2\mu\delta_t, \\ Y'_o[n'], & \text{when } \mu' = (2\mu+1)\delta_t, \\ 0, & o.w. \end{cases}$$

At step 372, an estimation algorithm is applied. In one embodiment 373, given the frequency domain symbols, the typical estimation algorithms can be applied, such as periodogram-based estimation schemes, multiple signal classification (MUSIC), etc. Take periodogram-based estimation schemes for example, the randomness of the transmit content is cancelled via division. For the even component, the even component after division can be given as $$D(n', \mu') = \frac{Y'[n', \mu']}{X'[n', \mu']} = \frac{Y'_e[2n]}{X_e[2n]} = \frac{Y_e[n]}{X[n]}$$
$$= \frac{1}{2}b_ie^{-\frac{j4\pi\tau_in}{N_cT_s}}e^{j2\pi f_{d,i}2\mu\delta_tT_o} = \frac{1}{2}b_ie^{-\frac{j2\pi\tau_in'}{N_cT_s}}e^{j2\pi f_{d,i}\mu'T_o},$$

where $n' = \left(n + \frac{1}{2}\right)\delta_f\left(n = 0, 1, \ldots, N_c/2 - 1\right)$, $\mu' = (2\mu+1)\delta_t\left(\mu = 0, 1, \ldots, \left\lfloor\frac{N_s}{2\delta_t}\right\rfloor - 1\right)$.

Therefore, both the even and odd components after division can be expressed as:

$$D[n', \mu'] = \begin{cases} \frac{1}{2}b_ie^{-\frac{j2\pi\tau_in'}{N_cT_s}}e^{j2\pi f_{d,i}\mu'T_o}, & \text{when } n' = 2n,\ \mu' = 2\mu\delta_t, \\ & \text{or } n' = 2n+1,\ \mu' = (2\mu+1)\delta_t, \\ 0, & o.w. \end{cases}$$

According to the periodogram-based estimation algorithms, the range-velocity map is derived by $$M\ (p, q) = \frac{1}{N_sN_c}\left|\sum_{\mu'=0}^{N_s-1}\left(\sum_{n'=0}^{N_c-1} D(n', \mu')e^{j2\pi\frac{n'p}{N_c}}\right)e^{-j2\pi\frac{\mu' q}{N_s}}\right|^2$$

In one embodiment 350, the final-half duration of the OFDM symbol with even or odd component can avoid ISI and ICI caused by long-range radar sensing. In other words, the detection distance with the delay of $T_c$+0.5$T_d$ is free from the ISI and ICI, and hence the SINR is improved, and the sensing performance is enhanced.

Figure 4:
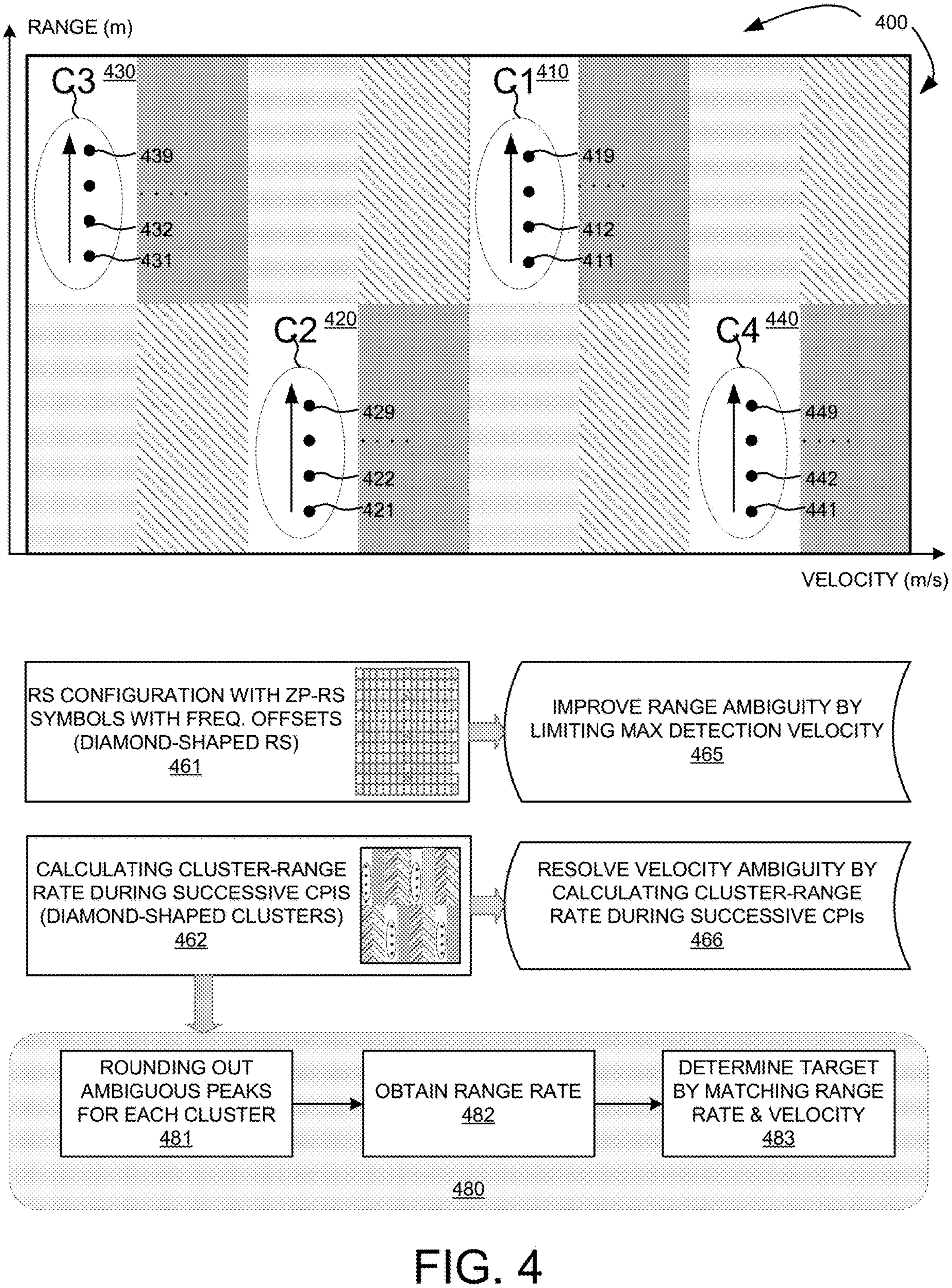
FIG. 4 illustrates exemplary diagrams for resolving ambiguity problems via calculating clustering-range rate during successive CPIs in accordance with embodiments of the current invention.

FIG. 4 illustrates exemplary diagrams for resolving ambiguity problems via calculating clustering-range rate during successive CPIs in accordance with embodiments of the current invention. In one novel aspect, RS configuration with zero-power RS symbols and/or cluster range rate are used to resolve range and velocity ambiguous issues. Range doppler (RD) map 400 illustrates exemplary ambiguous peaks in multiple clusters with N successive CPIs. The trajectory of the ambiguous peaks 411-419 within N=10 sampled successive CPIs are found out for the cluster $C_1$ 410. Besides, the ambiguous peaks 421-429 are recorded for the cluster $C_2$ 420, the ambiguous peaks 431-439 are recorded for the cluster $C_3$ 430, and the ambiguous peaks 441-449 are recorded for the cluster $C_4$ 440. A range rate for each cluster, including $C_1$ 410, $C_2$ 420, $C_3$ 430, and $C_4$ 440, are calculated. The match between the range rate and the velocity for each cluster is compared and the matched cluster is selected as the target distance and velocity without ambiguity.

In one novel aspect, RS configuration is designed to resolve the ambiguity issues. Since the RE is allocated with zero power in the even or odd subcarriers, the maximum unambiguous distance is halved following the conventional estimation scheme. In one embodiment 461, RS configuration with zero-power even and odd component RS symbols alternatively inserted with frequency offset are used for integrated sensing and communication. In one embodiment, the RS is configured with a diamond-shaped pattern, which translates to diamond-shaped the clusters of ambiguous peaks in the RD spectrum map, such as RD spectrum map 400. As a result (465), range ambiguity problem can be addressed by limiting the maximum detection velocity. In one novel aspect 462, cluster range rate is used to resolve the ambiguity issues. As a result (466), the velocity ambiguity is resolved by calculating clustering-range rate during successive CPIs. In some examples, the RS configuration configures diamond-shaped RS patterns in time frequency domain such that the multiple clusters in velocity-range domain are diamond-shaped to offset ambiguous peaks.

As illustrated, given the RD map 400, the ambiguous peaks will appear in the detectable area of the same pattern in pairs. Compared to the even/odd only component, the ambiguous peaks of the alternative RS design can be distinguished by different range or velocity, which can be utilized to resolve ambiguity problem. If the true velocity is determined, the true range is found out correspondingly, and vice versa. In practice, considering the distance and velocity of the moving target are continuously variable within a certain range, the trajectory of the moving target can be obtained within a cluster for the successive CPIs.

In one novel aspect 480, range rate is used to solve the ambiguity problem. At step 481, the ambiguous peaks are first found out via 2D-FFT for N successive CPIs for each cluster, and the target distance and velocity corresponding to the respective ambiguous peaks in RD map 400 are estimated. For example, the trajectory of the ambiguous peaks 411-419 within N=10 sampled successive CPIs are found out for the cluster $C_1$ 410. Besides, the ambiguous peaks 421-429 are recorded for the cluster $C_2$ 420, the ambiguous peaks 431-439 are recorded for the cluster $C_3$ 430, and the ambiguous peaks 441-449 are recorded for the cluster $C_4$ 440. If there are M clusters considered within N successive CPIs, for the cluster $C_m$, the estimated distance and velocity are represented by a set $(R_{m1},v_m)$, $(R_{m2},v_m)$, . . . , $(R_{MN},v_m)$. In one example, consider M=4 clusters within sampled N=10 successive CPIs, the estimated distance and velocity are $C_1$: $\{(R_{11}, v_1), (R_{12}, v_1), \ldots, (R_{1N}, v_1)\}$, $C_2$: $\{(R_{21}, v_2), (R_{22}, v_2), \ldots, (R_2N, v_2)\}$, $C_3$: $\{(R_{31}, v_3), (R_{32}, v_3), \ldots, (R_3N, v_3)\}$, $C_4$:$\{(R_{41},v_4), (R_{42},v_4), \ldots, (R_{4N},v_4)\}$. At step 482, for the m-th ($m\in[1,M]$) cluster in the n-th ($n\in[1,N]$) sampled CPI, the distance $R_{mn}$ and the velocity $v_m$ can be modeled as $R_{mn}=R_{m1}+v_m T_{cpi}(n-1)$, where $T_{cpi}$ is the duration of a CPI. The range rate Dm can be calculated via least square method (LSM). At step 483, the target is determined by the cluster with matched range rate and velocity. In other words, the cluster m is selected if $v_m \approx \hat{v}_m$. Therefore, the estimated target distance and velocity in the set $C_m$:$\{(R_{m1}, v_m), (R_{m2},v_m), \ldots, (R_{MN},v_m)\}$ are regarded as the target distance and velocity without ambiguity.

Figure 5:
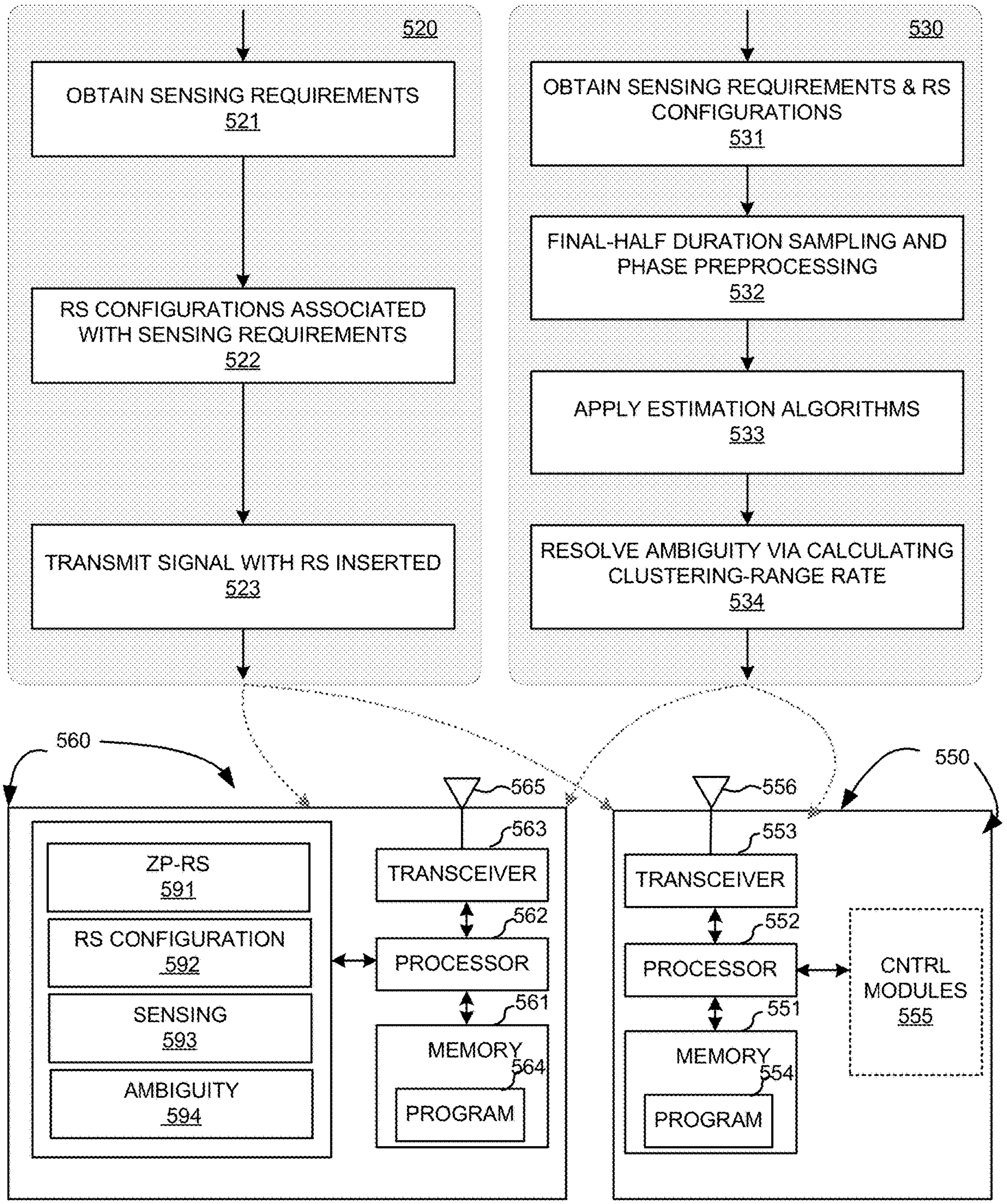
FIG. 5 illustrates top level flow diagrams for transmitter and receiver for sensing and communication with RS configuration and block diagrams for UE and base stations in accordance with embodiments of the current invention.

FIG. 5 illustrates top level flow diagrams for transmitter and receiver for sensing and communication with zero-power RS configuration and block diagrams for UE and base stations in accordance with embodiments of the current invention. Process 520 is an exemplary transmission process for a transmitter with RS configuration with zero-power RS symbols. At step 521, sensing and communication requirements of the application are obtained by the transmitter, which comprises at least one of the sensing mode, the sensing scenario, the maximum detection distance and velocity of interest, and service requirements corresponding to the RS configuration. Specifically, the sensing mode can be divided into active sensing and passive sensing. The sensing scenario of monostatic sensing is determined if the transmitter and the radar receiver are collocated, and otherwise it is bistatic sensing. The maximum detection distance of interest indicates the maximum target distance in the detection area of interest. Different service requirements are associated with different RS configurations at the transmitter and the corresponding signal processing and parameter estimation schemes at the receiver. For example, if the delay of the echo reflected from the target with maximum detection distance exceeds the CP length so that the ISI deteriorates the detection performance, the embodiment of the disclosure can be applied in a long-range radar sensing scenario, whether it is monostatic sensing or bistatic sensing. However, the delay relevant with the target distance differs between monostatic sensing and bistatic sensing due to the geographical location of the transmitter and the receiver.

At step 521, RS is specifically configured for the sensing and communication requirements at either the UE or the base station, which serves as a transmitter. For example, the maximum detection distance and velocity of interest can indicate the frequency spacing and time spacing between adjacent RSs, respectively. Particularly, for the OFDM symbol with RS, the transmit resources only occupy the odd or even subcarriers and the remaining subcarriers are left with zero power. In some examples, sensing RS of one direction/beam occupies subsets of subcarriers, e.g., subsets of odd or even subcarriers. In one embodiment, the size (sampling rate in frequency and time) of odd or even subcarriers for sensing RS depends on maximum detection distance and velocity of interest, while sub-carrier spacing may be fixed. In one embodiment, part of the remaining subcarriers of OFDM symbol with the sensing RS can transmit signal (of other RS or data); and the left subcarriers have zero power.

At step 523, the signal (data packets) with inserted RS generated at 522 is transmitted. According to the RS configurations, the generated RS is inserted into the data in the frequency domain. Then the data along with the RS are converted into the time domain via IFFT (Note: data and RS don't have to do together) and transmitted via radio frequency. It should be noted that data and RS can be transmitted on the same or different analog beam.

FIG. 5 also illustrates process 530 for receivers. The receiver can be a UE or a base station. At step 531, sensing and communication requirements of the application and the RS configurations are conveyed to the receiver. The sensing and communication requirements comprise at least one of the sensing scenario, and the maximum detection distance and velocity of interest, and other communication system requirements. Specifically, the sensing scenario of monostatic sensing or bistatic sensing determines the relationship between delay and target distance. The maximum detection distance and velocity of interest assist target estimation without ambiguity. RS configurations indicating the subcarrier indices and OFDM symbol indices of RS are utilized for received RS extraction in the frequency domain. At step 532, the final-half duration of the OFDM symbol with RS is obtained and the phase preprocessing is conducted for the odd components. Received the time-domain reflection signal, the final-half duration is obtained for each OFDM symbol with RS according to the obtained RS configurations at step 531. Also, if the non-zero power RSs occupy the odd components, a predetermined phase is compensated for each sample in the final-half duration. Otherwise, there is no phase preprocessing for the even components.

At step 533, an estimation algorithm is applied. Take the periodogram-based estimation algorithm for example, the samples from final-half duration with phase preprocessing at 532 are first transformed into the frequency domain symbols via FFT. Since the RS configurations consisting of the RS locations and transmit sequences are known in advance, the RSs are extracted and the randomness of the transmit sequences is eliminated via division. Then the RD map is obtained via 2D FFT. At step 534, the target distance and velocity are uniquely determined via calculating clustering-range rate during successive CPIs. For N successive CPIs, ambiguous peaks with distance and velocity estimation are figured out in the RD map generated at step 533, respectively. In one embodiment, since the ambiguous peaks compose a cluster as time goes by, the range rate Dm can be calculated via least square method (LSM). The target is determined by the cluster with matched range rate and average velocity.

FIG. 5 further illustrates simplified block diagrams of UE. The UE has an antenna 565, which transmits and receives radio signals. An RF transceiver circuit 563, coupled with the antenna, receives RF signals from antenna 565, converts them to baseband signals, and sends them to processor 562. RF transceiver 563 also converts received baseband signals from processor 562, converts them to RF signals, and sends out to antenna 565. Processor 562 processes the received baseband signals and invokes different functional modules to perform features in the UE. Memory (or storage medium or computer-readable medium) 561 stores program instructions and data 564 to control the operations of the UE.

Antenna 565 sends uplink transmission and receives downlink transmissions to/from base stations.

The UE also includes a set of control modules that carry out functional tasks. These control modules can be implemented by circuits, software, firmware, or a combination of them. A zero-power RS module 591 configures one or more zero-power RS symbol configurations indicating resource allocation in frequency domain with zero-power RS, wherein a zero-power RS symbol is an orthogonal frequency-division multiplexing (OFDM) symbol configured as an even component zero-power RS symbol with non-zero power RS occupy at least one even subcarrier and zero-power RS occupy all odd subcarriers or as an odd component zero-power RS symbol with non-zero power RS occupy at least one odd subcarrier and zero-power RS occupy all even subcarriers. An RS configuration module 592 configures an RS configuration with one or more zero-power RS symbols, wherein the RS configuration associates zero-power RS symbols with different sensing and communication requirements. According to some embodiments, the zero-power RS symbol configuration and/or the RS configuration is obtained by the UE, and the UE configures accordingly. A sensing module 593 performs integrated sensing and communication based on the RS configuration. An ambiguity module 594 calculates multiple clusters of a set of target distance and velocity performing successive sensing based on the RS configuration during N successive radar coherent processing intervals (CPI), calculates a range rate for each cluster, selects a cluster with velocity that matches the calculated range rate, and determines a target distance and velocity based on the selected cluster.

FIG. 5 further illustrates simplified block diagrams of the base station. The base station has antenna 556, which transmits and receives radio signals. An RF transceiver circuit 553, coupled with the antenna, receives RF signals from antenna 556, converts them to baseband signals, and sends them to processor 552. RF transceiver 553 also converts received baseband signals from processor 552, converts them to RF signals, and sends out to antenna 556. Processor 552 processes the received baseband signals and invokes different functional modules to perform features in the base station. Memory (or storage medium or computer-readable medium) 551 stores program instructions and data 554 to control the operations of the base station. Antenna 556 sends downlink transmission and receives uplink transmissions to/from the UE.

The base station also includes a set of control modules that carry out functional tasks. These control modules can be implemented by circuits, software, firmware, or a combination of them. Control module 555 performs tasks and communicates with the UE.

Please note that since both the UE and the base station can be receiver or transmitter, the modules that described in the context of the UE can also apply to the base station.

Figure 6:
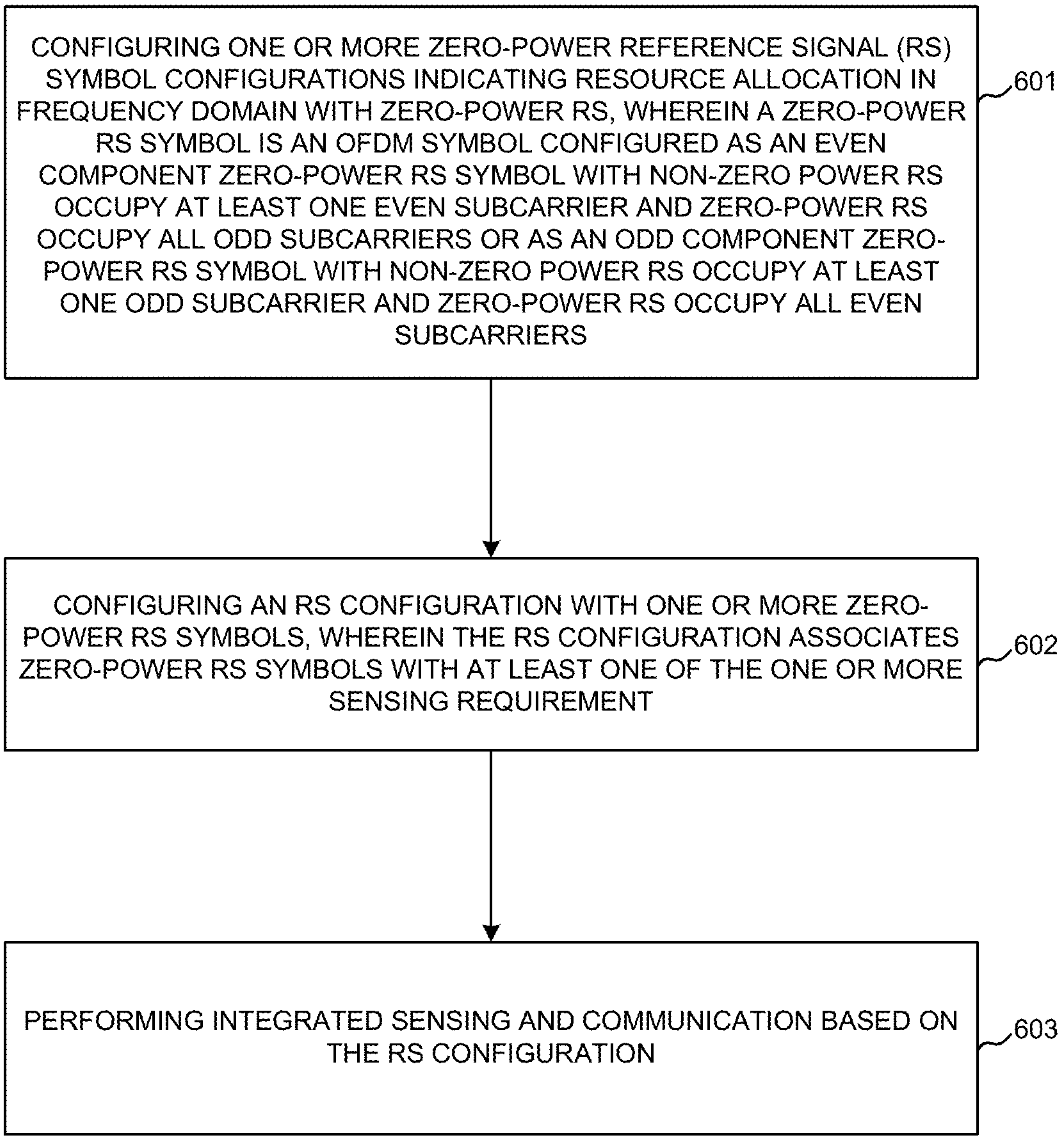
FIG. 6 illustrates an exemplary flow chart for the apparatus to use zero-power RS symbols and configuration for integrated sensing and communication in accordance with embodiments of the current invention.

FIG. 6 illustrates an exemplary flow chart for the apparatus to use zero-power RS symbols and configuration for integrated sensing and communication in accordance with embodiments of the current invention. The apparatus can be either a UE or a base station. At step 601, the apparatus configures one or more zero-power reference signal (RS) symbol configurations indicating resource allocation in frequency domain with zero-power RS, wherein a zero-power RS symbol is an OFDM symbol configured as an even component zero-power RS symbol with non-zero power RS occupy at least one even subcarrier and zero-power RS occupy all odd subcarriers or as an odd component zero-power RS symbol with non-zero power RS occupy at least one odd subcarrier and zero-power RS occupy all even subcarriers. At step 602, the apparatus configures an RS configuration with one or more zero-power RS symbols, wherein the RS configuration associates zero-power RS symbols with at least one of the one or more sensing requirement. At step 604, the apparatus performs integrated sensing and communication based on the RS configuration.

Figure 7:
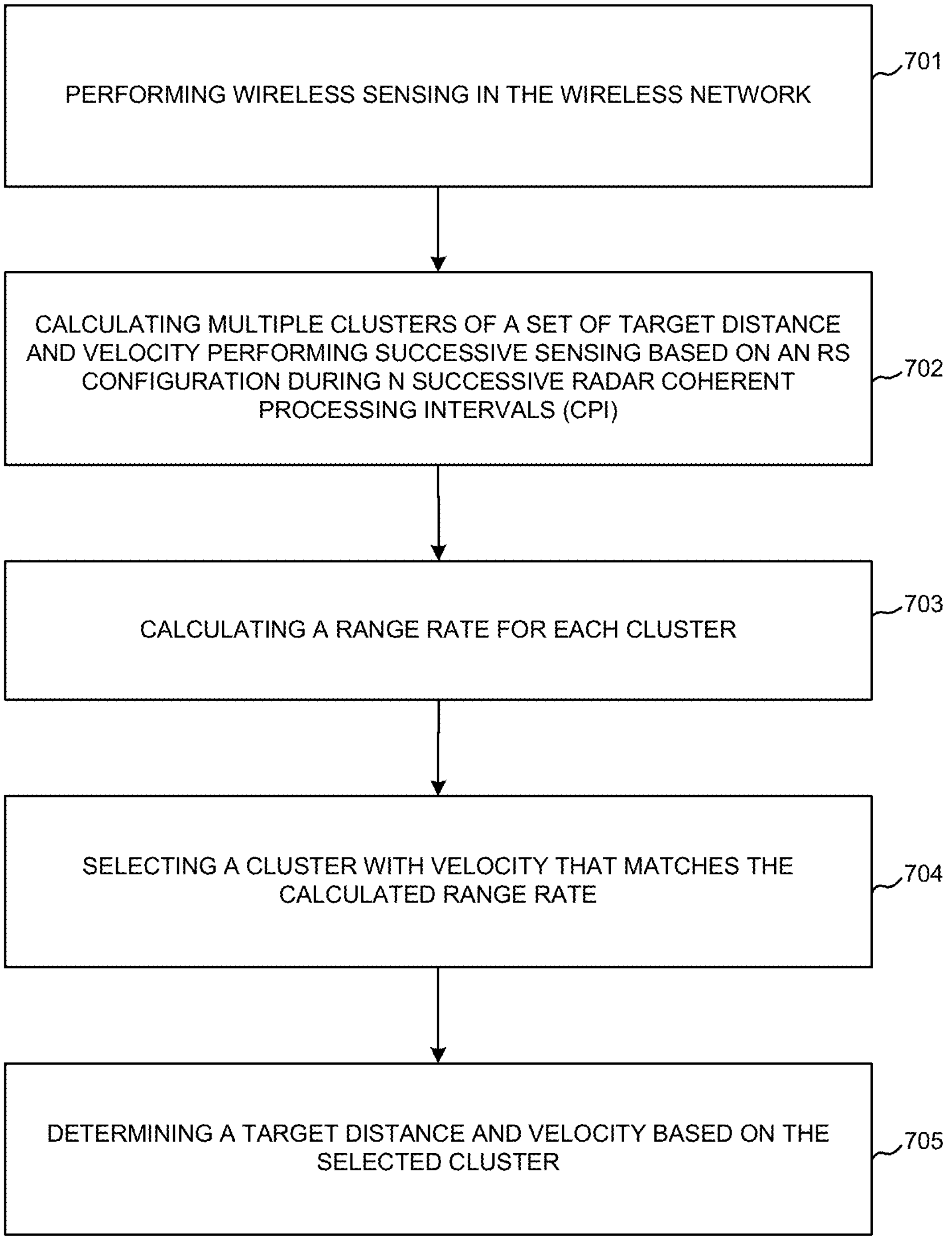
FIG. 7 illustrates an exemplary flow chart for the UE performing cluster-range rate for sensing in accordance with embodiments of the current invention.

FIG. 7 illustrates an exemplary flow chart for the apparatus perform cluster range rate for sensing in accordance with embodiments of the current invention. The apparatus can be either a UE or a base station. At step 701, the apparatus performs wireless sensing in the wireless network. At step 702, the apparatus calculates multiple clusters of a set of target distance and velocity performing successive sensing based on a RS configuration during N successive radar coherent processing intervals (CPI), wherein N is a positive integer. At step 703, the apparatus calculates a range rate for each cluster. At step 704, the apparatus selects cluster with velocity that matches the calculated range rate. At step 705, the apparatus determines a target distance and velocity based on the selected cluster.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for an apparatus using the orthogonal frequency-division multiplexing (OFDM) waveform for communications and sensing in a wireless network, comprising:
- configuring one or more zero-power reference signal (RS) symbol configurations with resource allocation in frequency domain with zero-power RS, wherein a zero-power RS symbol is a OFDM symbol configured as an even component zero-power RS symbol with non-zero power RS occupy at least one even subcarrier and zero-power RS occupy all odd subcarriers or as an odd component zero-power RS symbol with non-zero power RS occupy at least one odd subcarrier and zero-power RS occupy all even subcarriers;
- configuring an RS configuration with one or more zero-power RS symbols, wherein the RS configuration associates zero-power RS symbols with different sensing and communication requirements; and
- performing integrated sensing and communication based on the RS configuration.

2. The method of claim 1, further comprising: receiving sensing and communication requirements from the wireless network, wherein the sensing and communication requirements comprising at least one element comprising a sensing mode, a sensing scenario, a maximum detection distance and velocity of interest, and service requirements corresponding to the RS configuration.

3. The method of claim 1, wherein the apparatus is a user equipment (UE), and wherein the UE performs a wireless sensing by sampling a final-half duration of one or more zero-power RS symbols.

4. The method of claim 3, wherein a phase preprocessing is performed for each odd component zero-power RS symbol after the sampling of the final-half duration of corresponding zero-power RS symbol.

5. The method of claim 1, wherein multiple non-zero power RS in each zero-power RS symbol are equally spaced.

6. The method of claim 1, wherein the RS configuration configures alternatively inserted odd component zero-power RS symbol and even component zero-power RS symbol in resource, and wherein non-zero power RS subcarrier positions of odd component zero-power RS symbols and even component zero-power RS symbols are configured with a frequency offset.

7. The method of claim 1, wherein the performing integrated sensing and communication involves one or more procedures comprising transmitting data packets with RS symbols inserted based on the RS configuration and processing received zero-power RS symbols for wireless sensing based on the RS configuration.

8. The method of claim 1, wherein the apparatus is a UE, and wherein the UE obtains the RS configuration with one or more zero-power RS symbols from a base station.

9. The method of claim 1, wherein the apparatus is a base station, further comprising:

obtaining, by the base station, one or more sensing requirements in the wireless network.

10. An apparatus, comprising:

a transceiver that transmits and receives radio frequency (RF) signal in a wireless network:

a zero-power reference signal (RS) module that configures one or more zero-power RS symbol configurations indicating resource allocation in frequency domain with zero-power RS, wherein a zero-power RS symbol is an orthogonal frequency-division multiplexing (OFDM) symbol configured as an even component zero-power RS symbol with non-zero power RS occupy at least one even subcarrier and zero-power RS occupy all odd subcarriers or as an odd component zero-power RS symbol with non-zero power RS occupy at least one odd subcarrier and zero-power RS occupy all even subcarriers;

an RS configuration module that configures an RS configuration with one or more zero-power RS symbols, wherein the RS configuration associates zero-power RS symbols with different sensing and communication requirements; and a sensing module that performs integrated sensing and communication based on the RS configuration.

11. The apparatus of claim 10, wherein the sensing module performs a wireless sensing by sampling a final-half duration of one or more zero-power RS symbols.

12. The apparatus of claim 11, wherein a phase preprocessing is performed for each odd component zero-power RS symbol after the sampling of the final-half duration of corresponding zero-power RS symbol.

13. The apparatus of claim 11, wherein the RS configuration module further receives sensing and communication requirements from the wireless network, wherein the sensing and communication requirements comprising at least one element comprising a sensing mode, a sensing scenario, a maximum detection distance and velocity of interest, and service requirements corresponding to the RS configuration.

14. The apparatus of claim 10, wherein the zero-power RS module, the RS configuration module and the sensing module are replace by an ambiguity module, wherein the ambiguity module calculates multiple clusters of a set of target distance and velocity performing successive sensing based on the RS configuration during N successive radar coherent processing intervals (CPI), calculates a range rate for each cluster, selects a cluster with velocity that matches the calculated range rate, and determines a target distance and velocity based on the selected cluster.

15. The apparatus of claim 10, wherein the RS configuration configures alternatively inserted odd component zero-power RS symbol and even component zero-power RS symbol in resource, and wherein non-zero power RS subcarrier positions of odd component zero-power RS symbols and even component zero-power RS symbols are configured with a frequency offset.

* * * * *